Nov. 14, 1944. W. G. WESSMAN 2,362,873
GRINDING MACHINE
Filed Feb. 2, 1940 6 Sheets-Sheet 2
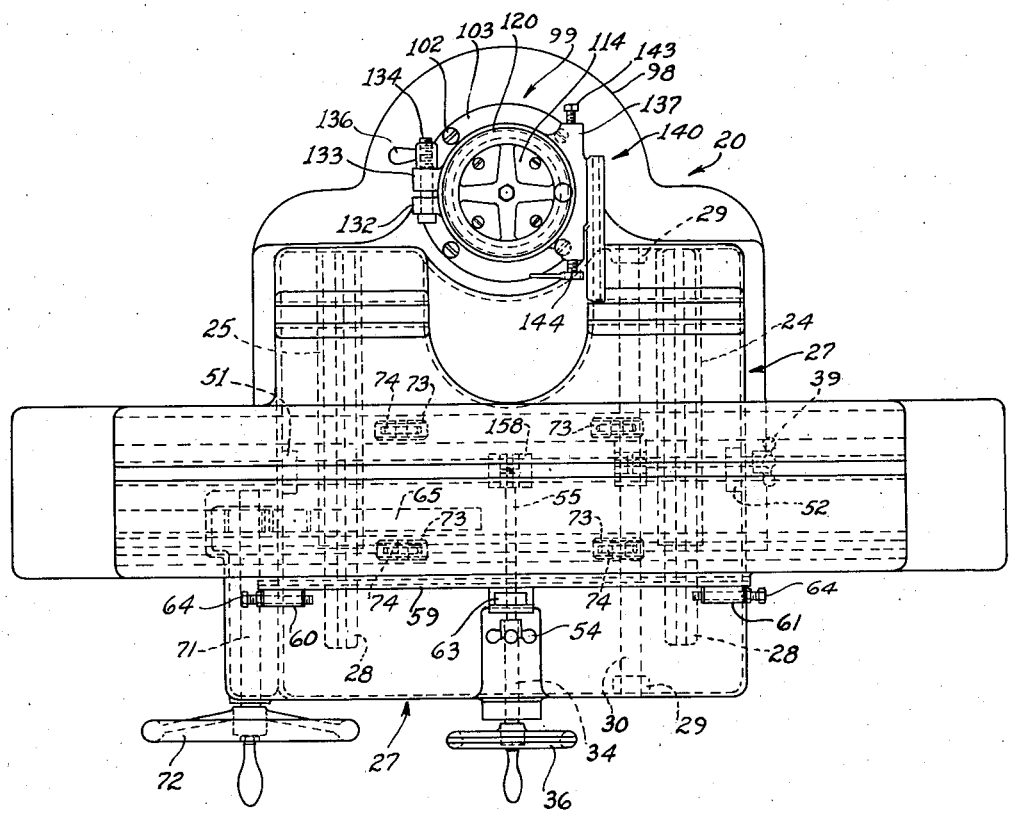
Fig. 2
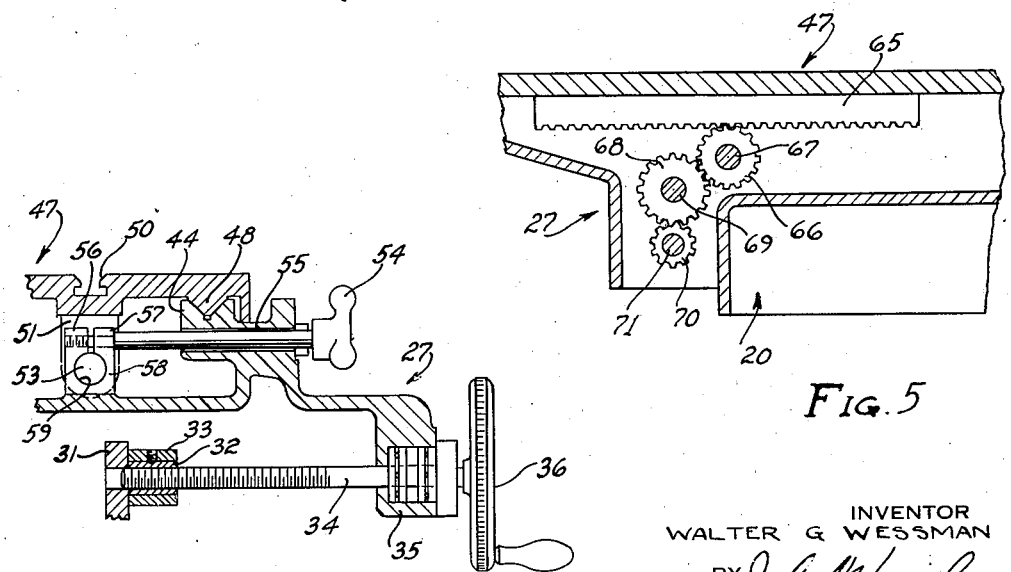
Fig. 4
Fig. 5
INVENTOR
WALTER G. WESSMAN
BY
ATTORNEY Nov. 14, 1944.  W. G. WESSMAN  2,362,873
GRINDING MACHINE
Filed Feb. 2, 1940  6 Sheets-Sheet 3
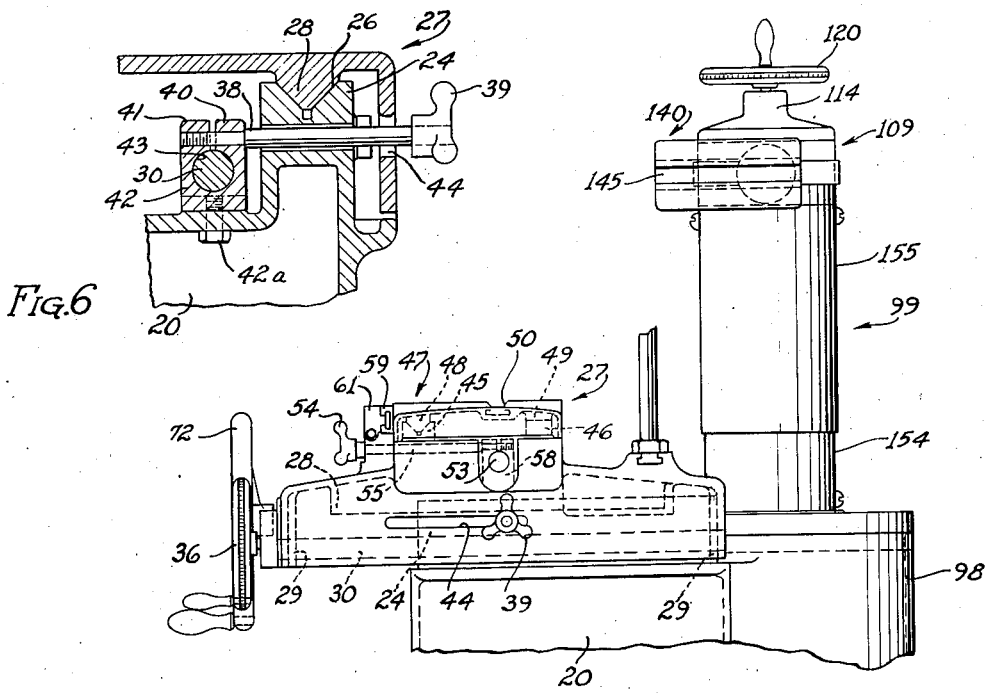
Fig. 6
Fig. 3
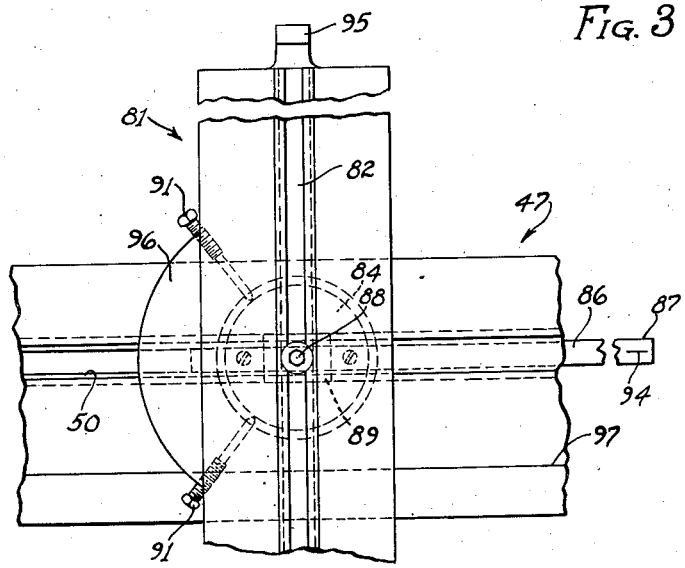
Fig. 7
Fig. 8
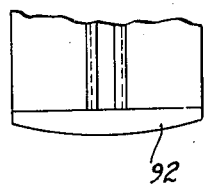
INVENTOR
WALTER G. WESSMAN
BY
ATTORNEY Nov. 14, 1944.                W. G. WESSMAN                2,362,873
                              GRINDING MACHINE
                           Filed Feb. 2, 1940          6 Sheets-Sheet 4
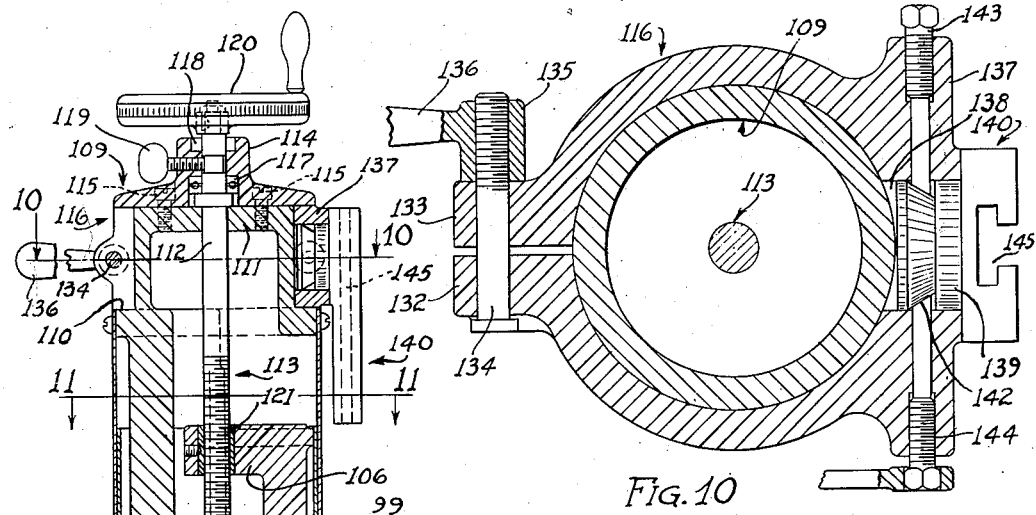
Fig. 10
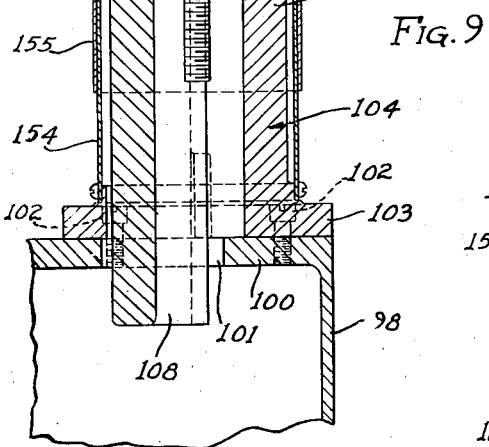
Fig. 9
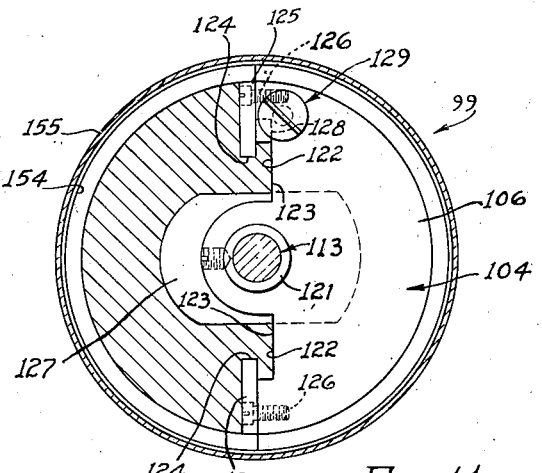
Fig. 11
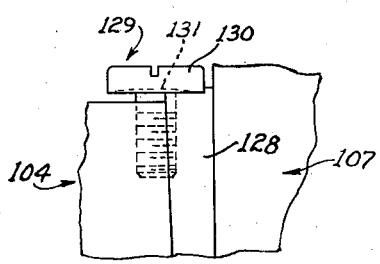
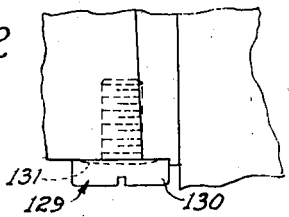
Fig. 12
INVENTOR
WALTER G. WESSMAN
BY John H. Hanrahan
ATTORNEY Nov. 14, 1944.   W. G. WESSMAN   2,362,873
GRINDING MACHINE
Filed Feb. 2, 1940   6 Sheets-Sheet 5
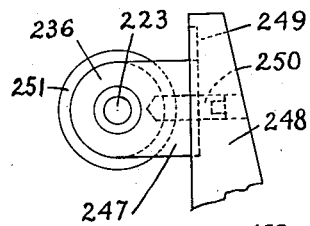
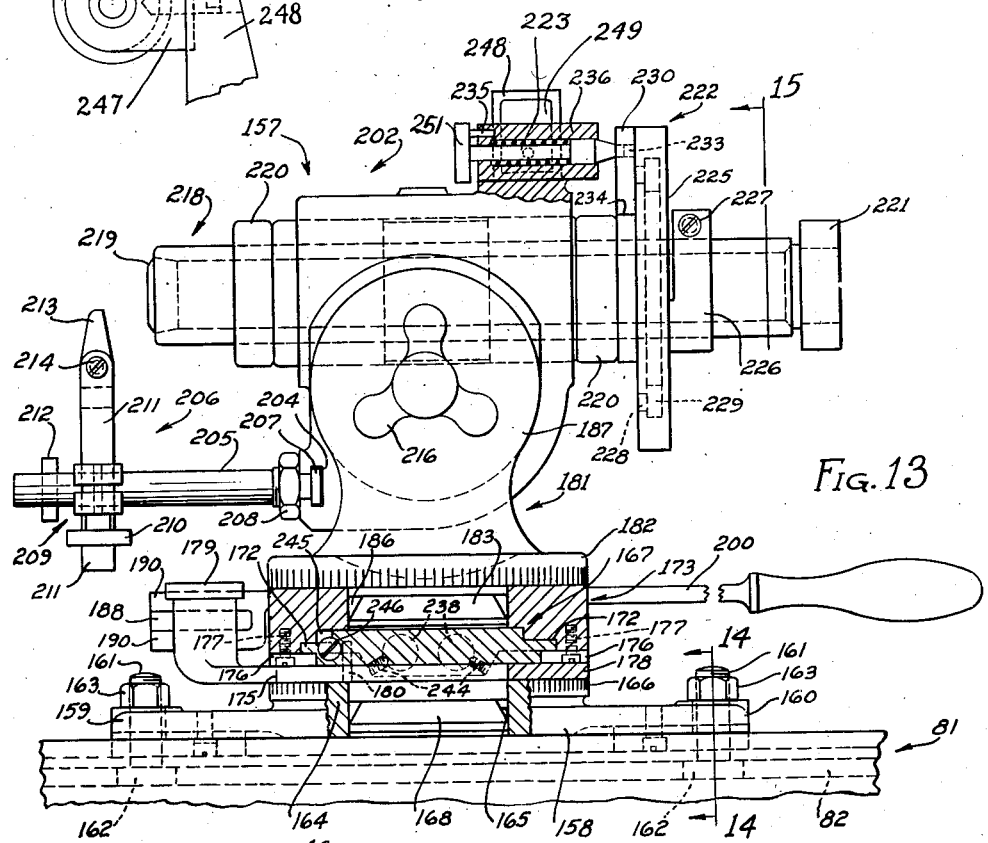
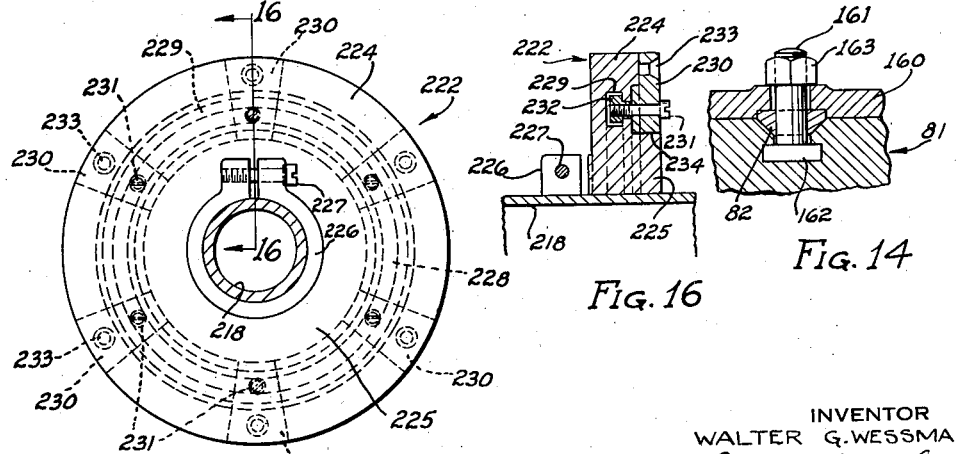
INVENTOR
WALTER G. WESSMAN
BY
ATTORNEY Nov. 14, 1944. W. G. WESSMAN 2,362,873
GRINDING MACHINE
Filed Feb. 2, 1940 6 Sheets-Sheet 6

INVENTOR
WALTER G. WESSMAN
BY John J Hanrahan
ATTORNEY

Patented Nov. 14, 1944

2,362,873

UNITED STATES PATENT OFFICE 2,362,873

GRINDING MACHINE

Walter G. Wessman, Bridgeport, Conn.

Application February 2, 1940, Serial No. 317,000

32 Claims. (Cl. 51—123)

This invention relates to new and useful improvements in grinding machines and while certain features of the invention are of general application in the art of grinding (as being adaptable for surface grinding) the invention more particularly relates to a machine for the grinding or sharpening of small millers, punches and dies, end mills, reamers, circular cutters, saws, straight and spiral millers, and also taps with straight and spiral flutes, including radial, convex and concave forms. The machine of the invention may also be used for intricate surface grinding, cylindrical and internal grinding, vertical as well as horizontal grinding, the inside grinding of dies and punches, as well as compensated grinding.

It is an object of the invention to provide a machine of substantially universal application for use in machine shops and the like whereby various types of cutters may be salvaged or reconditioned by sharpening of their teeth at a relatively high speed and minimum cost.

While the machine is adapted to sharpen the ends of cutters, taps and drills, it is particularly designed for more difficult grinding operations such as the grinding of straight and spiral flutes in cutters of relatively small sizes. Therefore the machine is very accurately constructed to insure proper registration of the flutes of cutters with the grinding wheel as the cutters are moved to and through grinding positions.

Cutting tools such as have been referred to are made of high speed steel and are extremely hard and consequently difficult to grind when ground on the present commercial types of grinders with the result that the attempted grinding operations are often unsatisfactory. The machine of the invention may readily be adjusted for the grinding of different sizes and lengths of cutters and thus adapted for variable types of grinding operations of the kind mentioned.

A further object of the invention is to provide a machine of the character indicated embodying a novel means for accurately securing a main work table in adjusted position, with adjustable means for accurately feeding the work relative to the grinding wheel and the providing of a machine for the purposes outlined and of the character indicated and which is of simple and inexpensive construction, which is efficient, automatic, and expeditious in operation, and which is adapted for the grinding of a very large variety of cutters, having different numbers of blades and flutes, and having their blades or flutes spaced in different ways.

An additional object is to provide a cutter grinding head including a compound table adapted for application to any of the usual surface grinder to convert the latter into a tool grinder having several of the characteristics above mentioned.

Other objects and advantages will become apparent from a consideration of the following detailed description taken in connection with the accompanying drawings wherein a satisfactory embodiment of my invention is shown. However, it is to be understood that the invention is not limited to the details disclosed, but includes all such variations and modifications as fall within the spirit of the invention and the scope of the appended claims.

In the drawings:

Fig. 2 is a top plan view of the machine, the grinding head, compound table, and work carrying head being omitted in order that other parts may be better shown;

Fig. 3 is an end elevational view taken as looking from the right in Fig. 2, the lower base portion of the machine being omitted;

Fig. 4 is a detailed sectional view showing a locking means for securing the main table in adjusted position and also showing in detail the means for feeding the table laterally;

Fig. 5 is a similar view showing the driving means employed for feeding the main table in the direction of its length;

Fig. 6 is a detail sectional view showing the means for securing a saddle and the main table in laterally adjusted positions;

Fig. 7 is a plan view showing one adjustment of the compound table on the main table;

Fig. 8 is a sectional view showing the means mounting the compound table on the main table for adjustment relative thereto;

Fig. 9 is a central longitudinal sectional view through the tool posts of the machine, the view being on an enlarged scale;

Fig. 10 is an enlarged transverse sectional view taken along the line 10—10 of Fig. 9;

Fig. 11 is a similar view taken along the line 11—11 of Fig. 9;

Fig. 12 is an enlarged detail sectional view showing the means for adjusting and holding the position of a gib used in the tool post;

Fig. 13 is a view partly in elevation and partly in section and showing on an enlarged scale the work carrying head of the machine;

Fig. 14 is a detailed sectional view as along the line 14—14 of Fig. 13 and showing the manner in which this head is secured in place on either the main or compound table;

Fig. 15 is a view showing the compensating index head, the view being taken as along the line 15—15 of Fig. 13;

Fig. 16 is a detailed sectional view taken as along the line 16—16 of Fig. 15;

Fig. 19 is a detail sectional view showing a lubricant applying means employed; and Fig. 20 is a view showing the index plunger and its adjustable mounting.

Figure 1:
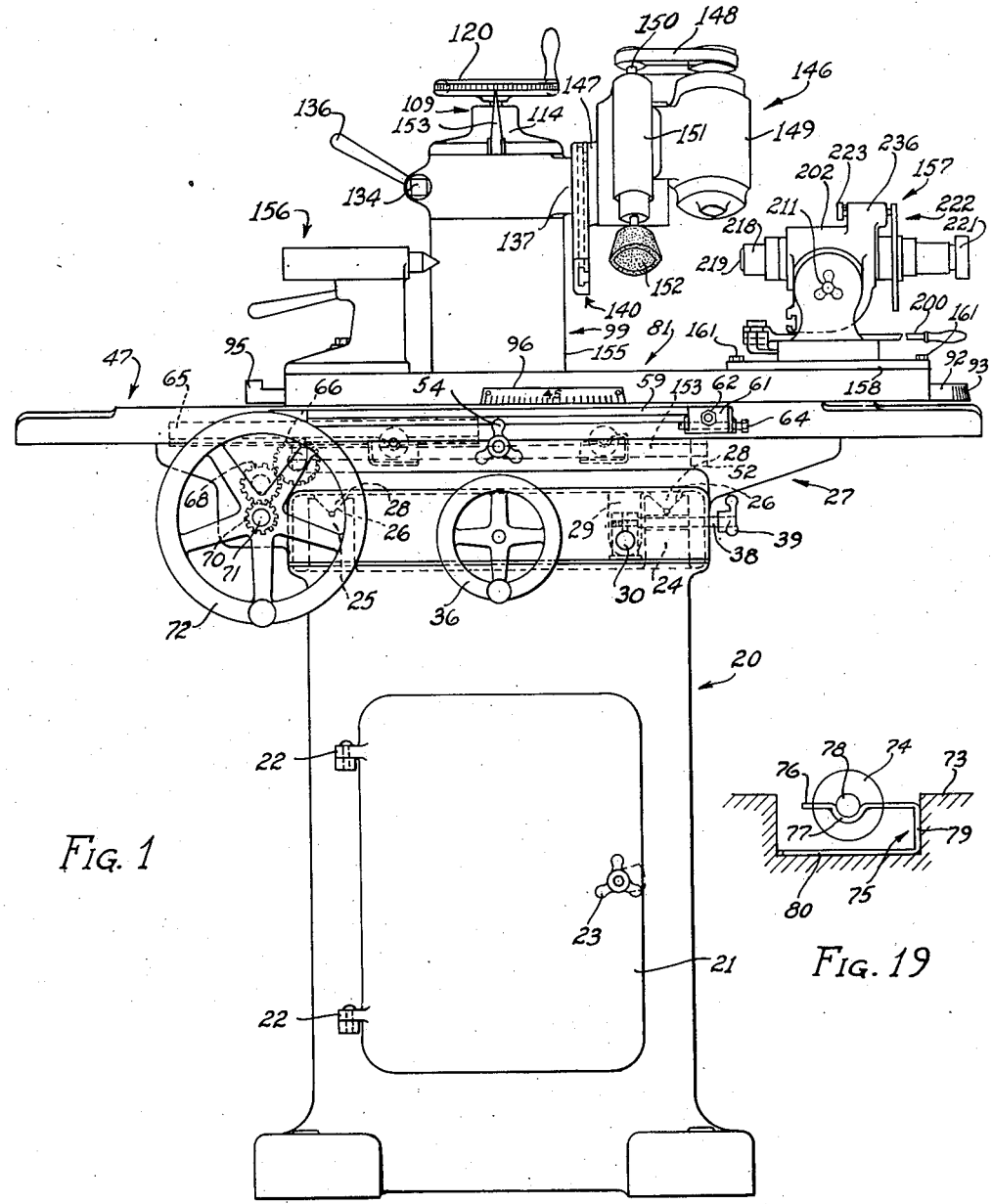
Fig. 1 is a front elevational view showing the grinding machine of the invention.

Referring in detail to the drawings, the machine of the invention as herein specifically disclosed includes a base generally designated 20 and which as usual in such cases is a hollow casting having a door 21, adapted to be swung open on hinge means 22 whereby to give access to the interior of the base wherein may be kept fixtures and the like. A latch means 23 is provided for retaining the door 21 in closed position.

On its upper side the base 20 includes forwardly to rearwardly extending bar-like members 24 and 25 each having in its upper surface a V-shaped guideway 26. Mounted on the members 24 and 25 is a support, more particularly a saddle 27, provided on its underside with V-blocks 28 engaging in the V-grooves or guideways 26 whereby the saddle is mounted on the base for forward and rearward adjustments thereon. Depending from the lower side of the saddle between the V-blocks 28 are a pair of spaced lugs 29 receiving the respective ends of a bar 30 and serving to rigidly secure the bar to the saddle and maintain the bar in parallel relation with the mentioned V-blocks.

Mounted by a lug 31 (see particularly Fig. 4) located on the upper side of the base and preferably midway the ends thereof is a nut 32 secured against movement relative to the saddle as by means of a bushing 33. Threaded into such nut is a bar or screw 34 having bearing in a lug 35 on the saddle forwardly of the lug 31. This screw extends at the forward side of the saddle and is there provided with a hand wheel 36 by means of which it may be rotated. Obviously with this arrangement as the hand wheel 36 is rotated in one direction or the other and the screw 34 is likewise rotated through the nut 32 the saddle 27 will be fed forwardly or rearwardly on the base 20. Since the feed is accomplished by the threaded engagement of the screw and nut it will be apparent that minute adjustments may be made and that the adjustments are affected by feeding of the screw through the stationary nut during rotation of the screw.

Extending transversely through the bar-like member 24 having the V groove or guideway 26 therein is a bar 38 at its outer end provided with a hand grip 39 (see Fig. 6) by means of which the bar may be rotated or turned. At its inner end bar 38 passes through portion 40 and is screw threaded into portion 41 of a split block 42 having an opening 43 therein through which the rod 30 extends. Block 42 is secured to the upper side of base 20 as by threaded means 42a. With this arrangement when the bar 38 has been turned to permit slight separation of the split portions of the block 42 the diameter of the opening through the latter is such that the rod 30 carried by the saddle may move freely with respect to said block as the saddle is adjusted forwardly and rearwardly it being understood that the bar 38 may have only turning movement in the member 24. In the latter connection it is noted that the saddle 27 is provided in its end skirt-like portion with a slot 44 to permit of movement of the saddle relative to bar 38.

After the hand wheel 36 has been operated to dispose the saddle (and the parts carried thereby and which will be hereinafter referred to) in the desired position of adjustment the hand piece 39 is operated to turn the bar 38 and through its screw threaded engagement with the split portions of the block 42 draw such portions toward one another. This will reduce the diameter of the opening 43 through the block and cause the latter to tightly grip the rod 30.

Obviously as the split in the block is located at the upper side of the rod 30 the drawing together of the split portions of the block in addition to causing the latter to grip the rod has a tendency to force the latter downwardly. This results in the V blocks 28 being drawn downwardly into the guideways 26 but does not result in even a slight forcing of the saddle 27 in any other direction. That is, with the locking means disclosed, any adjustment of the saddle will not be disturbed by the placing of the locking means in functioning condition. The saddle will not be forced either longitudinally or transversely of the ways 26 and thus the saddle may be locked in position without the slightest disturbance of the finest possible adjustment which may have been effected through manipulation of hand wheel 36.

On the upper side of the saddle 27 is a longitudinally extending bar 45 having a V groove therein and spaced transversely of the saddle from said guide bar is a parallel guide or rest bar 46 the upper surface of which is plane or smooth. These guides receive and mount a support, more particularly a main work table 47, on the under side of which is a long V-block 48 and yet parallel therewith is a longitudinally extending bar-like element 49 engaging or resting on the long guide or rest bar 46. Thus the main table is mounted on the saddle for movement therewith as the saddle is moved forwardly and rearwardly on the base or stand 20 and at the same time the table is mounted for movement in the direction of its length independent of or on the saddle.

In its upper side the table is provided with a V groove or guideway 50 for the purpose of receiving a key-like part of a compound table or a work supporting head all as will later more fully appear. Depending from the underside of the main table are a pair of spaced lugs 51 and 52 between which is disposed and by which is supported a rod 53 (see Figs. 1, 3 and 4) extending parallel with the guideways and which enters into the locking of the main table in any longitudinally adjusted position as will now be described.

Located at the forward side of the table and supported by the saddle (see also Fig. 4) is a hand piece 54. Such hand piece is secured to a bar 55 extending through the front wall of the upper portion of the saddle 27 and journaled by the saddle. At its inner end the said bar is threaded into one of the split portions 56 and 57 of a clamp-like locking means or block 58 similar to the means or block 42 already described. The locking means 58 is provided with an opening 59 through which the rod 53 may freely slide when the bar 55 is threaded in a direction to open or separate the split portions of the block 58.

However, after the table has been adjusted on the saddle the hand piece 54 is rotated or turned in the opposite direction to have the threaded engagement of the bar with the split portions of the block 58 draw such portions toward one another in a manner to have the block grip or clamp the rod 53. Thus the table is held in any desired adjusted position. It is noted that the drawing together of the split portions takes place at the upper side of the rod 53 and that as the latter is rigid with the table 48 there will be a tendency to draw the table down into the guideway or V groove in the member 44. Thus there is no tendency during the locking of the table to force the latter either longitudinally or transversely of the saddle and therefore the table may be locked in place without the slightest disturbance of the finest adjustment thereof.

Mounted on the forward edge of the main table 47 is a grooved bar 59 along which are adjustable stops 60 and 61 each adapted to be secured in adjusted positions as by screws 62 passing through the stops to bind against said bar. Carried by the saddle and located midway the ends of the bar 59 is a lug 63 adapted to be alternately engaged by the mentioned stops as the table is reciprocated during use. Each stop includes a screw 64 adapted to be adjusted minutely and which is the part of the stop that engages the lug 63 as the stop limits movement of the table in each direction. Obviously with the structure disclosed when the stops have been adjusted along the bar and secured in adjusted positions, as the table is moved back and forth (by the means and in the manner to be described) the stop screws 64 alternately engaging the lug 63 positively limit movement of the table in each direction.

Secured to the underside of the main table and extending longitudinally thereof is a rack bar 65 (see Figs. 1, 2 and 5). Meshing with the rack bar is a gear 66 mounted on a stub shaft 67 carried by the saddle 27. Thus gear 66 is adapted when rotated to cause the table 47 to move lengthwise of the saddle. Meshing with gear 66 is a gear 68 also journalled on a shaft 69 carried by the saddle and adapted to be driven by a gear 70 mounted on a shaft 71 extending to the front of the saddle and there equipped with a hand wheel 72.

With this arrangement it will be apparent that as the hand wheel 72 is rotated in one direction or the other the shaft 71 will be rotated and the meshing gears 70, 68 and 66 rotated whereby due to engagement of gear 66 with the teeth of the rack 65 the latter and the table 47 will be shifted longitudinally. The described means may be used to shift the table back and forth when the machine is being used as a surface grinder or the like and such feed of the table is used when the table is being adjusted prior to locking in adjusted position by the lock means including the split block 58 above described.

Mounted by the saddle at the underside of the main table are a number of boxes or receptacles 73 containing a lubricant. In each such receptacle is arranged a roller 74 mounted as by a spring device 75. As these lubricating means are but duplicates of one another the details of but one have been shown and attention is directed to Fig. 19. There it will be noted that the spring means 75 includes an upper arm 76 having a depression 77 therein receiving the bearing shaft 78 of a roller 74. Such arm 76 extends across the receptacle and then down one side thereof at 79 and then across the bottom of the receptacle at 80.

Since the bottom or lower arm 80 of the spring means has a snug fit between the walls of the receptacle 73 the spring means is yieldingly but securely mounted and attention is particularly directed to the fact that with the described arrangement any pressure on the roller will only result in depression of the upper arm 74 of the spring means.

Thus the flexing of the spring means will not cause the arm 74 to pinch the shaft 78 of the roller and pressure on the roller will not result in the latter remaining stationary. The roller will continue to roll or rotate when pressure is applied thereto in a manner to tend to rotate it. As the upper peripherial edge of the rollers engage the under parts of the table, i. e. the lower edge of the V block 48 and the lower edge of the rest or guide rail 49 it will be apparent that as the table is shifted back and forth the rollers will turn in the lubricant in the receptacle and apply such lubricant to the engaging parts of the table.

While as above suggested any suitable or desired tool or work holder may be mounted in the V-shaped guideway or groove 50 in the main table 47 in the drawing I have shown a compound table 81 as so mounted. The mounting of the compound table 81 on the main table 47 is shown in Figs. 1, 7 and 8. There it will be noted that the compound table is provided in its upper surface with a groove or guideway 82 the outer or upper portion of which is in the form of a V groove (see Fig. 14). The purpose of this V groove and of the V groove and V block on the saddle and main table respectively as well as the V groove and V block engagement between the main table and saddle is to prevent clogging of the grooves or guideways as by emery dust and the like. Thus with the structure disclosed should a thin film of dust form in the guideways the V blocks or guides may raise upwardly a few thousandths if necessary to pass along the guideways and will not be held by the pilling up of the dust ahead of the blocks.

In the lower side of the compound table 81 is a circular recess 83 receiving a disc 84. Integral with the disc 84 is a circular part 85 inclining from its lower edge toward the upper surface of the disc and at its lower side the disc has fixed to it a long key 86 extending at as 87 beyond the end of the compound table. This key is received in the V shaped guideway 50 whereby to guide movements of the compound table along the main table as will appear.

Extending through the disc and parts carried thereby is an Allen head screw 88 which at its lower end is threaded into a lock means 89 located in the lower part of the guideway 50 as best shown in Figs. 7 and 8. An opening 90 through the central portion of the compound table 81 gives access to the head of the screw 88 whereby the same may be tightened or loosened at will to permit of adjustment of the compound table on the main table as will later more fully appear. Radially disposed screws 91 have their inner ends engaged with the inclined surface portion 85 of the disc 84 and obviously on tightening of these screws the compound table will be rigidly drawn down onto the disc and the main table and secured against turning movement on the disc. On loosening of such screws the compound table may be given rotary adjustments relative to the said disc. The purpose of this arrangement will fully appear.

Since the key 86 will always be located in the groove 50 it will be apparent that the said key will always extend in the same direction relative to the main table. On one end of the compound table there is provided a projection 92 having graduations 93 thereon (see Fig. 1) which are to be read in connection with a zero or other mark 94 (see Fig. 7) on the projection end 87 of the key 86. Thus on loosening of the screws 91 the compound table may be rotated to a limited adjusted position relative to the main table and the amount of such limited adjustment determined by reading the graduations 93 in connection with the mark 94 on the outer end portion 87 of the key 86.

On the opposite end of the compound table 81 there is a projection or hand piece 95 whereby the said table may be conveniently rotated about the disc 84 when the screws 91 are loosed as described. When an adjustment has been made the screws are tightened and serve to secure the parts in rotary adjusted positions. It is noted that the tightening of said screws will serve to draw the compound table in the direction of the main table whereby not to disturb any adjustment by shifting the said compound table either longitudinally or transversely after an adjustment is made.

The mark 94 on the key and the graduations 93 are useful when a slight adjustment of the compound table about the disc 84 is being made and the graduations are in taper per foot for use in the grinding of tapered reamers and tapered cutters of all kinds and provides for instant setting for standard tapers. For adjustments in terms of degrees other means is provided. This other means includes an arc-shaped extension 96 on the forward intermediate edge of the compound table and which extension is provided about its outer edge with graduations (as shown in Fig. 1) which begin with a reading of zero at each end of the extension and run up to a reading of 45 degrees in the center thereof. These graduations are to be read in connection with a line 97 inscribed on the upper surface of the main table (see Fig. 7) and preferably extending for substantially the entire length thereof.

As the compound table is turned in one direction or the other the graduations at one side or the other of the 45 degree mark are read in connection with the line 97 and when the compound and main tables are at right angles to one another as in Fig. 7 one zero marking is on the line 97. When the two tables are parallel both zero markings are on said line and at intermediate stages the angle is determined by reading the graduations in connection with line 97 and when the angle is greater than 45 degrees the graduations at one side of the 45 degree mark are added to those at the other side thereof down to the line 97.

At the rear of the base 20 and preferably cast integral therewith and extending for the height thereof is a tool post supporting means 98 which is hollow both for the purpose of reducing weight and for the reception of a portion of an adjustable tool post as will appear. Mounted on this supporting means is a tool post generally designated 99 and which is shown in detail in Figs. 1, 2, 3, 9, 10 and 11. The supporting means 98 includes an upper end wall 100 (see Fig. 9) having an opening 101 therethrough for movement of a part of the tool supporting post as will be described.

Secured on wall 100 as by screws 102 is the lower circular end 103 of a stationary post element 104. Such element in addition to the circular end 103 includes a cored out vertical portion 105 having an upper end wall 106. Slidable on the element 104 is an adjustable element 107 the lower end portion 108 of which may move through the opening 101 during adjustments as will be apparent from an inspection of Fig. 9. The details of the slidable mounting of the element 107 on the element 104 will later be given.

At its upper end the element 107 includes a head-like portion 109 defined at its lower end by a radial shoulder 110 and including an upper wall 111 having a central opening therethrough for the passage of a smooth or unthreaded portion 117 of a screw 113. On the upper side of the wall 111 is a cap-like means 114 secured to the wall by screws 115 and having its edges projecting as shown in Fig. 9 whereby with the shoulder 110 to define an annular space receiving a split collar 116. Cap-like means 114 receives bearings 117 for the screw 113 and also receives a seal 118 about said screw. Further the cap-like means has threaded therethrough a set or locking screw 119 adapted to bind against the screw 113 whereby the latter (and parts operated thereby as will appear) may be locked in adjusted positions.

Screw 113 is provided at its upper end with a hand wheel 120 for ease of operation and is threaded into a bushing 121 fixed in the wall 106 of the fixed or stationary post element 104. Thus since the screw may have only turning movement in the wall 111 and the cap-like means 114 (both rigid with the movable element 107 of the post) it will be apparent that as the screw is turned in one direction or the other the screw will be fed through the bushing 121 and the post element 107 will be raised and lowered relative to stationary element 104. Element 107 is mounted on element 104 as best shown in Fig. 11. There it will be noted that element 107 includes an edge portion 122 bearing against the edge portion 123 of element 104 and that such portion does not extend for the width of element 107 and is undercut at 124 providing channels or grooves at each of its edges.

Element 104 is recessed in its forward edges to receive the portions 122 and secured to its outer edge portions or unrecessed portions are strips 125 held in place as by means of screws 126. These strips 125 enter the grooves or channels 124 in the element 107 and hold the vertical edges of that element against the vertical edges of the stationary element as will be readily apparent. In said Fig. 11 it will also be noted that the so called wall 106 of the element 104 is more in the nature of an extension and that the element 107 is hollowed out or recessed at 127 to accommodate said extension or wall.

A tapered gib 128 is arranged between an edge of element 107 and the corresponding shoulder portion of the stationary element 104 and may be adjusted to compensate for wear. Figs. 11 and 12 best illustrate the construction of the gib and the means by which it is adjusted and held in place. At each end of the element 104 a screw 129 is threaded into the same and such screws have relatively large heads 130 which are undercut or hollowed out on their undersides about their shanks or threaded portions as at 131 leaving the under edge of the screw head tapering towards its peripherial edge. The ends of the gib are correspondingly cut as best shown in the mentioned figures and such shaped portions of the gib are engaged by the heads of the screws in an overlapping or interlocking relation.

With this construction it will be apparent that the screws 129 may be adjusted to shift the gib in the desired direction and to hold it in adjusted position. In addition, owing to the overlapping engagement between the heads of the screws and the ends of the gib, it will be apparent that the screws act to hold the gib tightly against the inner edge portion of the stationary post element 104. Thus if there has been wear and the gib is not a tight fit between the elements 104 and 107 the gib will yet be held against the element 104 and will not have any free movement in the space between such elements and therefore may not interfere with free smooth movement of the element 107 on or relative to the element 104.

Referring now to the split collar-like member or tool holder 116 on the upper end of the element 107. The split ends 132 and 133 of the collar have a bolt 134 passing through them and threaded unto such bolt is a nut or member 135 having a handle 136. Obviously by turning the nut in one direction or the other, using the handle 136 for convenience, the collar may be caused to tightly grip the head or may be loosened to be adjusted about the head.

This collar (see Fig. 10) opposite its split portion is provided with an enlargement or boss 137 having a recess 138 therein receiving a circular portion 139 of a holder 140. Circular portion or lug 139 is intermediate its ends undercut providing an outwardly tapering shoulder 142. A pair of oppositely arranged screws 143 and 144 are threaded through the enlargement or boss and their inner ends are adapted to engage the tapered portion 142 of lug 139 whereby to clamp said lug in any adjusted position. Obviously on loosening of the screws 143 and 144 the lug or projection 139 may be rotated or adjusted about a horizontal axis relative to the collar 116 and to the post 99. After adjustments have been made the screws 143 and 144 are tightened to maintain the holder 140 in desired position.

Holder 140 has a channel or way 145 therethrough and such way is preferably a T-slot as shown. Any suitable grinding unit, such as that shown in Fig. 1 and generally designated 146 may be mounted by the holder. Unit 146 includes a mounting plate 147 having an extension entering the channel or way 145 for adjustment therein. Plate 147 mounts an electric motor 149 which through a belt or other equivalent means 148 drives a shaft 150 which at its lower end, beyond a bearing 151, carries any desired or suitable grinding wheel 152.

Being mounted in or by the holder 140 it will be apparent that the unit 146 may be adjusted lengthwise of the way or channel 145 whereby to change the position of the wheel 152 relative to the work. In addition the angle of the wheel may be adjusted by loosening of the screws 143 and 144 and the rotating of the holder 140 and its projection or lug 139. It will also be born in mind that by manipulation of the hand wheel 120 the screw 113 may be rotated to raise and lower the tool post element 107. In connection with vertical adjustments of the tool post it is noted that the edge of the wheel 120 bears graduations and that a pointer 153 on the cap 114 (which is not rotatable) is provided to facilitate reading of such graduations.

To exclude dust and grit from any of the inner working parts of the tool post a cylindrical sleeve 154 of sheet metal is secured to the lower portion of the stationary post element 104 and is telescopingly received in a similar sleeve 155 carried by the movable post element 107. Thus the interior parts are protected in all positions of the post. Striking of the head portion 109 against the stationary portion 104 limits downward movement of the post parts and it is noted that with the long wide area of engagement between the post elements 104 and 107 there is a large area of contact between such elements in all positions of adjustment whereby a rigid structure is provided. In fact the limits of adjustments on the element 107 are such that owing to the greater length of element 107, the elements have to serve contacting area in all positions of adjustment of element 107.

Shown mounted on the compound table 81 (see Fig. 1) and adjustable longitudinally thereof is any or the usual sail stock 156. Also mounted on said table and adjustable along the same as will later be set forth is a universal head stock 157. Obviously if desired the head and tail stocks might be mounted directly on the main table the compound table being omitted.

Figure 17:
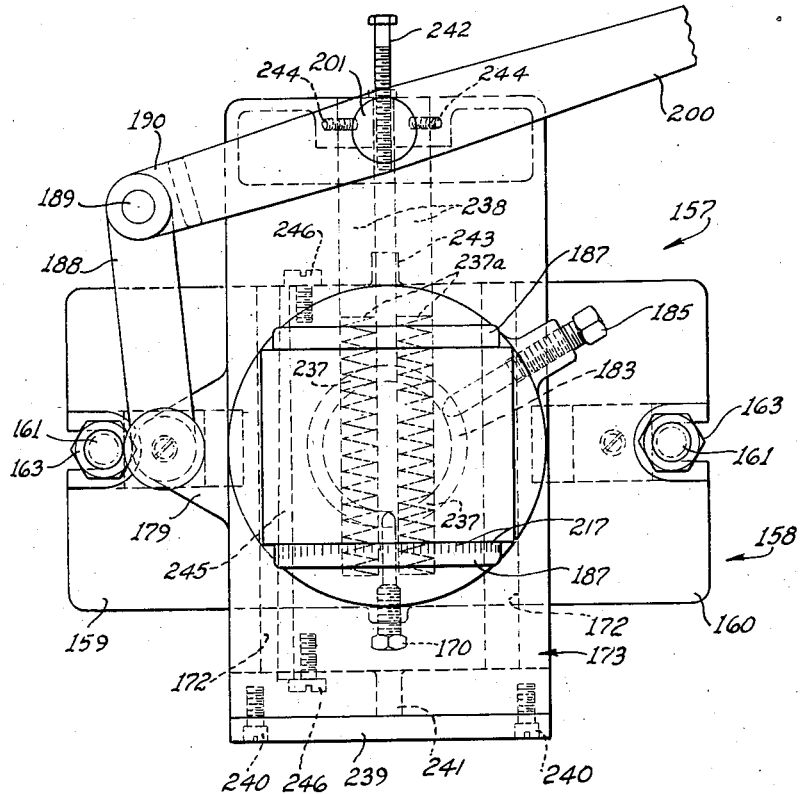
Fig. 17 is an enlarged plan view of the head of Fig. 13.
Figure 18:
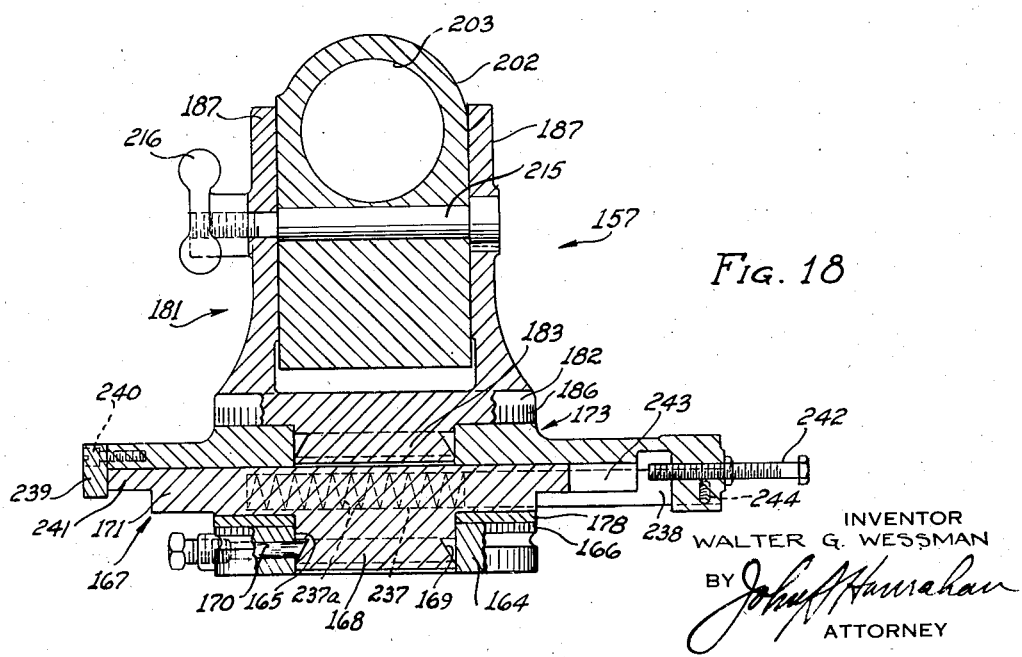
Fig. 18 is a central longitudinal sectional view of the head shown in Fig. 17.

The head stock is shown in detail in Figs. 13, 17 and 18 and there it will be noted that the same includes a base or mounting portion 158 including extensions 159 and 160 through which are passed bolts 161 having their heads or lower ends 162 located in the inverted T shaped portions of the groove 82 in the compound table. On loosening of the nuts 163 on the upper ends of the bolts the universal head 157 may be adjusted longitudinally of the compound table along the groove 82. Thereafter, the head being in the desired position of adjustment the nuts are tightened and the head secured in position.

Base 158 includes a raised hollow central portion 164 having a circular opening 165 therethrough. Such portion about its upper edge is provided with markings or graduations 166 the purpose of which will appear. Mounted by this central portion 164 is a casting or turret 167 including a projecting portion 168 received in the opening 165 and having a tapered surface 169 to be engaged by a securing screw 170 whereby to be secured in the desired position of rotary adjustment with relation to the said base. Integral with the upper end of the portion 168 is a means or track member 171 having edges or way portions 172 extending longitudinally thereof.

A carriage member 173 is mounted on the body or way carrying portion 171 of the turret member 167 and is adapted to be slid along the same guided by the mentioned keys. Carriage 173 has recesses into which the ways 172 project and in which they are held by small plates 176 secured to the carriage as by the screws 177.

It will be clear that with this arrangement the carriage may be moved along the guides or ways 172. Disposed about the upper part of portion 168 between the turret portion 171 and the upper surface of the central raised portion 164 of the base is a ring-like member 178 carrying a hub-like portion or extension 179 the purpose of which will be described. This ring-like member is also provided with a dowel pin 180 entering a portion of the turret whereby the ring-like member is secured against turning movement about but may turn with the turret.

As will be clear from an inspection of Fig. 17 the carriage 173 is disposed at right angles to the base 158 in the drawings although it will later appear that the relation of these parts may be changed by rotary adjustment of the turret and thus the carriage on the base. This is accomplished by loosening of the screw 170 and the turning of the turret (which mounts the carriage)

on the base and the degree of adjustment may be determined from the reading of the graduations 166 on the central portion of the base in connection with a zero marking 176 on the ring 178.

Mounted by the carriage 173 is a bracket 181 comprising a base portion 182 having depending therefrom a round projection 183 the intermediate portion of which is tapered for cooperation with a securing screw 185. The depending portion 183 enters an opening 186 in the carriage and the base portion 182 carries a pair of upstanding spaced plates 187 which constitute mountings for a bearing member to be described. Obviously on loosening of screw 185 the bracket 181 may be adjusted on the carriage about a vertical axis.

On the lug or extension 179 is pivotally mounted a link 188 to the outer end of which is attached by means of a pivot 189 the bifurcated end portion 190 of a lever 200 which in spaced relation to its said bifurcated end is pivoted at 201 to the carriage 173. With this arrangement it will be clear that on manipulation of the lever 200 the carriage 173 may be moved back and forth on the ways 172. Obviously the turret 167 has no sliding movement with the carriage. Between the plates 187 of the bracket 181 is mounted a block 202 having an opening 203 therethrough for the reception of a spindle as will presently appear. At its forward side the block carries or is provided with a slot 204 receiving the inner end of a rod 205 forming part of a finger stop generally designated 206.

The rod 205 has a head portion 207 received in the slot 204 and a nut 208 threaded onto the bar may be adjusted to engage the block as shown in Fig. 13 whereby to rigidly secure the bar to the block. A clamp 209 is slidable on the bar and may be secured in adjusted position thereon by tightening of the screw 210. This clamp mounts an upright 211 adjustable vertically through the clamp and adapted to be secured in the desired position of vertical adjustment on tightening of the screw 212. The upright includes an upper end portion or spring finger 213 pivoted at 214 whereby it may be swung to an out of the way position when desired.

Block 202 is pivotally mounted between the plates 187 and by a bolt 215 whereby on tightening of a hand piece 216 on the bolt the said block may be clamped in any desired position of adjustment about a horizontal pivot. The upper edge of one of the plates 187 is provided with graduations 217 whereby the degree of adjustment may be determined. A spindle 218 is slidable and rotatable in the opening 203 through the block 202 and in its forward end is provided with a chuck 219 by means of which work may be secured in the spindle. Mounted on the spindle at the forward and rearward sides of the block 202 are collars 220 adjustable along the spindle whereby to limit the sliding movement of the spindle in the block and in fact to secure the spindle against any sliding movement in the block if desired as when adjusted to the positions of Fig. 13 wherein the collars are against the opposite sides of the block.

At its rear end the spindle may be provided with a hand piece 221 by means of which the spindle is manipulated as by being rotated and/or moved longitudinally through the block when the collars 220 have been adjusted to permit of such movements. On the rear portion of the spindle I have shown a compensating indexing wheel 222.

This wheel cooperates with a spring pressed plunger 223 mounted on the top side of the block 202. The index wheel as better shown in Figs. 15 and 16 includes a body 224 having a hub portion 225 adapted to be clamped to the spindle as by tightening of the split collar 226 about the spindle on tightening of a screw 227. The body of the wheel is in the form of a disc and opening through one face of the body is a groove 228 leading to a circular channel 229 extending entirely about the wheel. This channel together with the opening or slot 228 provides, when viewed in transverse section a T slot.

The index control lugs 230 are secured against the face of the body by means of bolts 231 passing through the lugs and the slot 228 and threaded into nuts 232 located in the channel 229. Obviously the nuts may be adjusted to any position in the channel and then the bolts tightened into them to draw the lugs against the face of the body. Thus the lugs may be spaced the same or different distances apart. Each lug is provided with an opening or recess 232 for cooperation with the plunger 223 and further each lug at its lower edge engages an annular shoulder 234 provided on the face of the body. With this engagement it will be clear that the lugs may not rotate about the securing bolts 231. On the head of the spring pressed plunger 223 is a pin 235 located eccentric of the plunger and adapted to engage the face of the plunger housing 236 and maintain the plunger in an inoperative position of the plunger being pulled out against the action of the spring and then given a partial rotation and released.

Turret 167 is provided in its body portion 171 with a pair of parallel sockets 237 receiving coil springs 237a. The sockets are closed at their inner ends and plungers 238 carried by the forward end of the carriage 173 enter such sockets and engage the outer ends of the coil springs. Thus it will be apparent that the springs acting on the plungers and the latter being carried by the carriage 173 the springs constantly tend to maintain the carriage in the position shown in Fig. 17. A depending plate 239 secured to the rear end of the carriage by the screws 240 acts as a stop to be engaged by a lug 241 extending rearwardly from the turret and engaging the said plate when the carriage is in normal position whereby to limit movement of the carriage by the coil springs.

By means of the handle or lever 200 the carriage may be moved against the resistance of the coil springs and movement of the carriage by such means is also limited. For this latter purpose the carriage at its forward end mounts an adjustable screw 242 adapted to engage a lug 243 on the forward end of turret body 171 and limit movement of the carriage against the action of the springs or under manipulation by the said lever or handle 200. Obviously by adjusting the screw 242 the carriage may be moved a greater or lesser distance on manipulation of the handle or lever. As shown in Figs. 13, 17 and 18 the plungers 238 are secured to the carriage by set screws 244 although it will be understood that any suitable means for this purpose may be employed. Located in the guideways between the turret 167 and the carriage 173 is a wear compensating gib 245 at the end of which are a pair of adjusting screws 246 corresponding exactly with the screws 129 above described.

From the foregoing description taken in connection with the accompanying drawings it will be clear that the machine without the compound table and the universal head 157 may be used as a surface grinder by the application of a magnetic chuck or the like to the main table 47. Conversely by the application of the compound table and the head 157 to a surface grinder the latter may be converted into a very useful tool grinder.

The various feeds of the saddle and the main table through manipulation of the hand wheels 36 and 72 will, it is believed be fully understood. The functions of the locking means for the saddle and the main table will also be clear from the above description. However, it is thought that some description of the operation of the other parts may be useful and thus a brief description of the operation of such parts will be given.

Work may be supported between the headstock 157 and the tail-stock 156 although in many cases the tail-stock may be entirely omitted from the machine. In such cases the work or part to be ground will be supported in the spindle 218 being held in place by the chuck 219. When the work is being held by the chuck 219 and the collars 220 are tight against the block 202 the carriage 173 with the bracket 181 may be moved by the lever 200 in conjunction with the coil springs 237a.

Under such circumstances the turret 167 is secured in the desired angular relation to the base 158 by the screw 170 and then on manipulation of the lever the work is carried back and forth across the grinder 152. Obviously the angle at which the turret is adjusted on the base is determined according to the work to be performed.

On loosening of the nuts 163 the head 157 may be adjusted to the desired relation to the tool post since the head is movable along with the compound table. In addition the grinder unit 146 may be adjusted about the post 99 (on loosening of the collar 116) and along the channel 145 in the bracket 140, and about a horizontal axis relative to the post on loosening of the screws 143 and 144. On operation of the screw 113 by the hand wheel 120 the post 99 is adjusted vertically to dispose the entire unit 146 in the desired location vertically relatively to the table 47.

When a spirally fluted tool is to be ground the collars 220 may be backed away from the block 202 whereby the spindle 218 may be moved longitudinally through the said block. Through the use of the hand piece 221 the spindle may be drawn back and forth through the block and at the same time given a spiral turning movement to have the edges of the spiral flutes of a tool follow a grinder in the location of grinder 152. Obviously the grinder 152 is changed to suit any particular job that may be undertaken. The stop finger 211 is used to guide movements of the cutter when the same is being turned by manual manipulation of the spindle 218 through the hand piece 221. With the collars 220 in the positions in which they are herein shown the finger stop will not be in use and may be removed from the machine or simply adjusted to an out-of-the-way position.

Owing to the construction of the indexing wheel or disc 222 it will be clear that unequal indexing of the spindle 218 may be readily accomplished. The lugs 230 are set in the desired relation on the disc depending on spacing of the teeth of the cutter to be ground. This may be accomplished by having the lugs 230 equally spaced or otherwise. The slot 238 is annular, opening through a face of the wheel 222, and the channel 239 containing the nuts 232 is also annular. Therefore any desired annular relation of the lugs 230 may be had.

On loosening of the screws 91 the compound table may be adjusted as through an arc of 90 degrees relative to the main table as to the position shown in Fig. 7. Also on loosening of the screw 88 the disc 84 together with the key 86 and the compound table may be adjusted along the main table in the direction of the length of the latter and may in fact be removed from such main table to permit of the use of the machine for surface grinding as above suggested.

When comparatively slight the degree of angular adjustment of the compound table on the main table may be determined by a reading of the graduations 93 (on extension 92 of the compound table) in connection with the mark 94 on the projecting end of the key 86. When the adjustment is through a greater angle the degree of the adjustment may be read on the graduations on the edge of the arcuate projection 96 when taken in connection with the line 97 inscribed on the upper surface of the main table. Obviously adjustment of the block 202 and thus of the spindle 218 about a horizontal axis is accomplished by loosening of the hand piece 216 and rocking of the block on the bolt 215. The degree of this adjustment may be read on the graduations 217 on the upper edge of one of the side plates 187 of the bracket 181.

Housing 236 mounting the spring pressed plunger 223 is mounted for vertical adjustment and as shown best in Figs. 13 and 20 is provided with a lateral block-like extension 247 received in a recess 249 in a support 248 provided as part of or secured to the block 202. A screw 250 secures the extension 247 in the desired position of vertical adjustment in the recess 249. The hand piece by means of which the plunger 223 is manipulated is designated 251. With the described construction it will be clear that the spring pressed plunger may be adjusted for cooperation with indexing discs having radial rows of plunger receiving openings.

Having thus set forth the nature of my invention, what I claim is:

1. In a grinding machine, a base having a guideway therein, a support, a guide block on said support and entering said guideway for guiding movement of the support on the base, means for moving the support on the base, a bar rigid with said support, a clamping block on said base and having an opening through which said bar passes, said clamping block split from one edge through said opening, means for forcing together the split portions of said clamping block to have the latter grip the bar and secure it and the support against movement on the base, and said clamping block split in its portion at the top side of said bar whereby as said split portions are forced toward one another the guide block is forced into the guideway.

2. In a grinding machine, a base, a saddle on the base, a table on the saddle, V-shaped guideways and V-shaped blocks between the base and saddle and providing for movement of the latter relative to the former, V-shaped guideways and V-shaped blocks between the table and the saddle and providing for movement of the former on the latter in directions at right angles to the directions in which the saddle is movable on the base, said V-shaped guideways arranged with their open sides facing vertically, means for moving the saddle on the base, means for moving the table on the saddle, means for securing the saddle in adjusted position on the base comprising means for forcing the V-shaped block and the V-shaped guideway between the saddle and base into tighter engagement by a vertical movement without disturbing adjustment of the saddle longitudinally and transversely of the guideways, and other means for securing the table in adjusted position on the saddle comprising means for forcing the V-shaped block and the V-shaped guideway between the table and saddle into tighter engagement by a vertical movement without disturbing adjustment of said table longitudinally and transversely of said guideways.

3. In a grinding machine, a base, a saddle on the base, a table on the saddle, V-shaped guideways and V-shaped blocks between the base and saddle and providing for movement of the latter relative to the former, V-shaped guideways and V-shaped blocks between the table and the saddle and providing for movement of the former on the latter in directions at right angles to the directions in which the saddle is movable on the base, means for moving the saddle on the base, means for moving the table on the saddle, a bar rigid with each of the saddle and table and extending respectively in the directions of movement of the saddle and table, a clamping block on the base and having an opening through which the saddle carried bar moves, a clamping block on the saddle and having an opening through which the table carried bar moves, said clamping blocks split from their openings through their edges, means for forcing the split portions of the clamping blocks toward one another to have the clamping blocks grip the respective bars to secure the saddle against movement on the base and the table against movement on the saddle.

4. In a grinding machine, a base, a saddle on the base, a table on the saddle, V-shaped guideways and V-shaped blocks between the base and saddle and providing for movement of the latter relative to the former, V-shaped guideways and V-shaped blocks between the table and the saddle and providing for movement of the former on the latter in directions at right angles to the directions in which the saddle is movable on the base, means for moving the saddle on the base, means for moving the table on the saddle, a bar rigid with each of the saddle and table and extending respectively in the directions of movement of the saddle and table, a clamping block on the base and having an opening through which the saddle carried bar moves, a clamping block on the saddle and having an opening through which the table carried bar moves, said clamping blocks split from their openings through their edges, means for forcing the split portions of the clamping blocks toward one another to have the clamping blocks grip the respective bars to secure the saddle against movement on the base and the table against movement on the saddle, and said clamping blocks split in their portions toward the saddle and table respectively whereby as said split portions are forced toward one another the respective pairs of V-shaped blocks and V-shaped grooves are forced into tighter engagement.

5. In a grinding machine, a base, a main table on the base, said table having a longitudinally extending slot opening through its upper surface, a compound table on said main table and comprising an elongated body having a longitudinally extending slot opening through its upper side, a key entering said slot in the main table for guiding movement of the compound table longitudinally of the main table, a disc fixed to said key, said compound table having a circular recess in its underside receiving said disc whereby the compound table is mounted against the main table for turning movement relative thereto, means for locking said disc and compound table in the desired position along the length of the main table, means for locking the compound table to said disc in any position of rotary adjustment relative to said main table, an arcuate projection on one edge of said compound table intermediate the ends thereof, graduations on said projection and reading in opposite directions from 45 degrees in the center thereof to zero toward the ends thereof, and a straight line on the main table at the upper side thereof and extending for substantially the length thereof and in connection with which said graduations may be read in any position of adjustment of the compound table.

6. In a grinding machine, a base, a main table on the base, a compound table directly on the main table, means providing for longitudinal and rotary adjustment of the compound table on the main table, an arcuate projection on one edge of said compound table intermediate the ends thereof and directly against the upper side of the main table, graduations on the outer arcuate edge of said projection and reading in opposite directions from 45 degrees in the center thereof to zero toward the ends thereof, and a straight line on the main table at the upper side thereof and extending for substantially the length thereof and in connection with which said graduations may be read in any position of adjustment of the compound table.

7. In a grinding machine, a base, a main table on the base, said table having a longitudinally extending slot opening through its upper surface, a compound table on said main table and comprising an elongated body having a longitudinally extending slot opening through its upper side, a key entering said slot in the main table for guiding movement of the compound table longitudinally of the main table, a disc fixed to said key, said compound table having a circular recess in its underside receiving said disc whereby the compound table is mounted against the main table for turning movement relative thereto, means for locking said disc and compound table in the desired position along the length of the main table, means for locking the compound table to said disc in any position of rotary adjustment relative to said main table said key projecting beyond one end of said compound table, graduations on said end of the compound table, and a mark on the projecting end of the key and in connection with which said graduations may be read on limited adjustment of the compound table about the disc.

8. In a grinding machine, a table, means for feeding said table in the direction of its length and transverse to said direction, a tool post at one side of said table, said post including a pair of substantially semi-cylindrical elements of which one is of greater length than the other, means securing the shorter of said elements in fixed position, cooperating ways on the longitudinal edges of the said elements and mounting the longer of said elements on the shorter element for vertical sliding movement thereon, a gib associated with said elements and adjustable to compensate for wear in said ways, a feed screw for sliding the longer element on the shorter element, means on the longer element for supporting a grinding unit for cooperation with work on said table, and said longer element of such greater length with respect to the shorter element and the limit of adjustment on the shorter element that a constant length of the longer element is in engagement with the shorter element in all positions of adjustment of the longer element whereby the latter is rigidly supported in all positions.

9. In a grinding machine, a table, means for feeding said table in the direction of its length and transverse to said direction, a tool post at one side of said table, said post including a pair of substantially semi-cylindrical elements of which one is of greater length than the other, means securing the shorter of said elements in fixed position, cooperating ways on the longitudinal edges of the said elements and mounting the longer of said elements on the shorter element for vertical sliding movement thereon, a gib associated with said elements and adjustable to compensate for wear in said ways, a feed screw for sliding the longer element on the shorter element, means on the longer element for supporting a grinding unit for cooperation with work on said table, said longer element of such greater length with respect to the shorter element and the limit of adjustment on the shorter element that a constant length of the longer element is in engagement with the shorter element in all positions of adjustment of the longer element whereby the latter is rigidly supported in all positions, and a pair of telescoping sleeves disposed about and secured to the respective elements whereby to cover the same and exclude dust from the interior of the post in all positions of adjustment thereof.

10. In a grinding machine, a table, means for feeding said table in the direction of its length, a vertical tool post at one side of said table, a collar on and adjustable about the upper end portion of said post, means for clamping said collar to the post in the desired position of adjustment of the collar about the post, a grinder unit mounting bracket having a slot along which the unit may be adjusted, said collar having a side socket therein, an annular lug on said bracket and received in said socket whereby the bracket is mounted on the collar for adjustment relative thereto about a horizontal axis, said lug including a tapered surface portion, and means carried by said collar and adjustable against the tapered surface portion of said lug to force the same inwardly of said socket and draw the bracket against the collar to secure the bracket in the desired position of adjustment relative to the collar.

11. In a grinding machine, a table, means for feeding said table in the direction of its length, a vertical tool post at one side of said table, a collar on and adjustable about the upper end portion of said post, means for clamping said collar to the post in the desired position of adjustment of the collar about the post, a grinder unit mounting bracket having a slot along which the unit may be adjusted, said collar having a side socket therein, an annular lug on said bracket and received in said socket whereby the bracket is mounted on the collar for adjustment relative thereto about a horizontal axis, said lug including a tapered surface portion, and means carried by said collar and adjustable against the tapered surface portion of said lug to force the same inwardly of said socket and draw the bracket against the collar to secure the bracket in the desired position of adjustment relative to the collar, said post comprising a pair of elements of which one is stationary and the other vertically slidable on the stationary one, means for adjusting the slidable element on the stationary element, and said collar carried by said slidable element.

12. In a machine, an element having a guideway therein, an element having a portion entering said guideway whereby one of said elements is slidable relative to and is guided by the other thereof, a tapered gib in said guideway at one edge thereof, a screw in said stationary element at each end of said gib, said screws having their heads overlapping the respective ends of said gib, said screws having their heads undercut on their inner sides, and said gib having its ends shaped to be partly received in the undercuts at the inner sides of the screw heads whereby the screws may be adjusted to hold the gib against end wise movement and also against the stationary element against sidewise movement relative thereto.

13. In a grinding machine, a base, a post on said base, a motor driven grinding wheel mounted on the post, a table on the base, means for moving the table on the base with respect to the grinding wheel, a turret mounted on the table for adjustment relative thereto about a vertical axis, a bracket on the turret, cooperating guide means on the turret and bracket and mounting the latter on the former for limited horizontal reciprocating movement only, means for sliding the bracket, a spindle bearing member, a pivot mounting said spindle bearing member in the bracket for adjustment relative thereto about a horizontal axis, a cutter spindle mounted in said member, means to clasp a cutter in said spindle, and independent means for locking the turret and the spindle bearing member in their respective positions of adjustment.

14. In a grinding machine, a base, a post on said base, a motor driven grinding wheel mounted on the post, a table on the base, means for moving the table on the base with respect to the grinding wheel, a turret mounted on the table for adjustment relative thereto about a vertical axis, a bracket slidably mounted on the turret, means for feeding the bracket in one direction on the turret, spring means to move the bracket in the opposite direction, a spindle bearing member hung in the bracket for adjustment relative thereto about a horizontal axis, a cutter spindle mounted in said member, means to clamp a cutter in said spindle, and independent means for locking the turret and the spindle bearing member in their respective positions of adjustment.

15. In a grinding machine, a base, a post on said base, a motor driven grinding wheel mounted on the post, a table on the base, means for moving the table on the base with respect to the grinding wheel, a turret mounted on the table for adjustment relative thereto about a vertical axis, a bracket slidably mounted on the turret, means for sliding the slidable bracket, a spindle bearing member hung in the bracket for adjustment relative thereto about a horizontal axis, a cutter spindle rotatably mounted in said member, means to clamp a cutter in said spindle, and independent means for locking the turret and the spindle bearing member in their respective positions of adjustment, an indexing disc on the spindle, and a guide pin for engagement with said disc.

16. In a grinding machine, a table, means for feeding said table in the direction of its length, a tool post at one side of said table, a collar on and adjustable about a vertical axis at the upper end portion of said post, means to secure said collar in the desired position of adjustment about the post, a grinder unit mounting bracket having a slot along which the unit may be adjusted, means mounting said bracket on said collar for adjustment relative thereto about a horizontal axis, means for securing said bracket in adjusted position on the collar, a turret rotatably mounted on the table for adjustment relative thereto, a bracket slidably mounted on the turret, means for operating the slidable bracket, a spindle bearing member hung in the bracket, a cutter spindle mounted in the member, means to clamp a cutter in said spindle, and means to lock the turret in the desired position of rotary adjustment.

17. A grinding means including a table having a way in its upper side and a circular recess in its lower side, a disc in said recess, a key associated with said disc and extending beyond one end of said table, means pivotally mounting the table on the disc and adapted to be tightened to secure the disc and table rigidly together, graduations on one end of said table and adapted to be read in connection with the projecting end of said key, means associated with said disc and key for mounting said table on a second table, a tool supporting head, means associated with said head and adapted to cooperate with the slot in the first table to mount the head thereon, said head including a base, a turret turnable on said base, means to secure the turret in fixed position on said base, a carriage slidable on said turret, manual means for sliding said carriage in one direction on the turret, spring means for sliding the carriage in the opposite direction on the turret, a bracket mounted on the carriage for turning movement relative thereto, means to secure the bracket in fixed position relative to said carriage, a tool holding spindle, and means pivotally mounting said spindle on said bracket.

18. A grinding means including a table having a way in its upper side and a circular recess in its lower side, a disc in said recess, a key associated with said disc and extending beyond one end of said table, means pivotally mounting the table on the disc and adapted to be tightened to secure the disc and table rigidly together, graduations on one end of said table and adapted to be read in connection with the projecting end of said key, means associated with said disc and key for mounting said table on a second table, a tool supporting head, means associated with said head and adapted to cooperate with the slot in the first table to mount the head thereon, said head including a base, a turret turnable on said base, means to secure the turret in fixed position on said base, a carriage slidable on said turret, a bracket mounted on the carriage for turning movement relative thereto, means to secure the bracket in fixed position relative to said carriage, a tool holding spindle, and means pivotally mounting said spindle on said bracket.

19. In a grinding means, a head including a base, a turret turnable on said base about a vertical axis, means to secure the turret in fixed position on said base, a carriage slidable on said turret, manual means for sliding said carriage in one direction on said turret, spring means for sliding the carriage in the opposite direction on the turret, a bracket mounted on the carriage for turning movement relative thereto about a vertical axis, means to secure the bracket in fixed position relative to said carriage, a spindle bearing member, a pivot mounting said member on the bracket for adjustment relative thereto about a horizontal axis, a cutter spindle in said member, means to secure a cutter in said spindle, and means for securing said member in adjusted position relative to said bracket.

20. In a grinding machine, a base, a saddle on said base, a table on the saddle, guideways and guide blocks between the base and saddle and providing for movement of the latter relative to the former, guideways and guide blocks between the table and the saddle and providing for movement of the former on the latter in directions at right angles to the directions in which the saddle is movable on the base, means for moving the saddle on the base, means for moving the table on the saddle, a bar rigid with each of the saddle and table and extending respectively in the directions of movement of the saddle and table, a clamping block on the base and having an opening through which the saddle carried bar moves, a clamping block on the saddle and having an opening through which the table carried bar moves, said clamping blocks split from their openings through their edges, and means for forcing the split portions of the clamping blocks toward one another to have the clamping blocks grip the respective bars to secure the saddle against movement on the base and the table against movement on the saddle.

21. In a head of the class described, a base, a turret, said turret mounted on the base for rotatable adjustment relative thereto, a carriage slidable on the turret, means for sliding the carriage, a bracket mounted on the carriage for rotatable adjustment relative thereto about an axis extending in the same direction as that about which the turret is rotatably adjustable, said rotatable mounting of the turret and bracket comprising circular openings in the base and carriage, an annular extension on each of the turret and bracket and entering and having turning fits in the openings in the base and carriage respectively, each of said extensions having a tapered surface portion, and independent means carried by the base and carriage respectively and adjustable against the tapered surface portions of the respective extensions for drawing the turret against the base and the bracket against the carriage to secure the turret and bracket in adjusted positions.

22. In a grinding machine, a base, a saddle movable on said base, a main table movable on said saddle, means for moving the saddle on the base, means for moving the main table on the saddle in directions at right angles to the directions in which the saddle is movable on the base, said main table having a longitudinally extending slot opening through its upper surface, a key entering said slot and movable longitudinally thereof, a disc movable with said key and disposed at the upper side of said main table, a compound table receiving said disc and mounted thereby for turning movement relative to the main table, means for locking said key and thereby the disc and compound table in the desired position along the length of the main table, means for locking the compound table to the disc in any position of rotary adjustment of the compound table relative to the main table, an arcuate projection on one edge of said compound table intermediate the ends thereof, graduations on said projection and reading in opposite directions from 45 degrees in the center thereof to zero toward the ends thereof, and a straight line on the main table at the upper side thereof and extending for substantially the length thereof and in connection with which said graduations may be read in any position of rotary and longitudinal adjustment of the compound table on the main table.

23. A portable head adapted to be mounted on a table or the like, said head comprising a unitary device including a plate-like base adapted to be disposed on a table-like support, a turret on said base, a vertical pivotal connection between the turret and base whereby the turret may be rotatably adjusted relative to the base, a slide, means mounting said slide on the turret for limited reciprocating movement relative thereto, means for imparting such movement to the slide, a bracket, a vertical pivotal connection between the bracket and slide whereby the former may be rotatably adjusted relative to the latter, a bearing member, horizontal pivotal means mounting said bearing member on the bracket for pivotal adjustment relative thereto, independent means for securing the turret, bracket and bearing member in adjusted positions, a spindle rotatably mounted in said bearing member, and a tool shank receiving chuck in the forward end of said spindle and in axial alignment therewith.

24. In a grinding machine, a base, a table movably supported on the base, means for moving the table on the base, a turret mounted on the table for adjustment relative thereto about a vertical axis, a bracket slidable on the turret, means for feeding the bracket in one direction on the turret, spring means to move the bracket in the opposite direction, a spindle bearing member hung in the bracket for adjustment relative thereto about a horizontal axis, a spindle in said spindle bearing member, means to clamp a tool shank in said spindle with the axis of the tool shank concentric with that of the spindle, and independent means for locking the turret and the spindle bearing member in their respective positions of adjustment.

25. In a grinding machine, a base, a table movably mounted on the base, means for moving the table on the base, a turret mounted on the table for adjustment relative thereto about a vertical axis, a carriage reciprocable on said turret, a bracket mounted on said carriage for adjustment relative thereto about a vertical axis, means for reciprocating the carriage on the turret, a spindle bearing member, a horizontal pivot mounting said bearing member in said bracket for adjustment relative thereto, a spindle rotatably mounted in said bearing member with its axis of rotation at right angles to said horizontal pivot, a chuck in the forward end of said spindle to receive and clamp a tool shank with the axis of the latter concentric with the axis of the spindle, and independent means for locking the turret, bracket and spindle bearing member in their respective positions of adjustment.

26. In a grinding machine, a base, a main table on the base, said table having a longitudinally extending slot opening through its upper surface, a compound table on said main table and comprising an elongated body having a longitudinally extending slot opening through its upper surface, a key entering said slot in the main table for guiding movements of the compound table longitudinally of the main table, a disc fixed to said key, said compound table having a circular recess in its underside receiving said disc whereby the compound table is mounted against the main table for turning movement relative thereto, means for locking said disc and compound table in the desired position along the length of the main table, and means for locking the compound table to said disc in any position of rotary adjustment relative to said main table.

27. In a grinding machine, a base, a support, guideways, guide blocks interfitting with one of said guideways, said guideways and guide blocks fixed one to said base and the other to said support and both located between the base and support and providing for guided rectilinear movement only of the latter relative to the former, means for moving the support on the base, a bar rigid with one of said base and support, a clamping block rigid with the other of the base and support and having an opening through which the bar passes, said clamping block split from said opening through its edge toward said support, and means for forcing toward one another the split portions of said clamping block to have the latter grip the bar and force the guideways and guide blocks into tighter engagement and thereby secure the support against movement on the base.

28. In a head of the class described, a base having a circular recess opening through a face thereof, a turret on said face of the base, an annular extension on said turret and extending into said recess, said extension including a portion having a bearing fit in said recess whereby the turret may be turned on the base, said extension including a tapered portion in said recess and facing the same direction as said face of the base, rigid means adjustable through the base into engagement with radially spaced portions of said tapered portion of the extension to secure the turret in adjusted position on the base, said tapered portion of the extension flaring away from the turret and said rigid means engaging said tapered portion only inwardly of the outer end thereof whereby as said means is forced against said portion the extension is cammed into the recess and the turret drawn tight against said face of the base and held against casual movement relative to the latter.

29. In a head of the class described, a base having a circular recess opening through a face thereof, a turret, a circular extension rigid with said turret and rotatably disposed in said recess and thereby mounting the turret on said base for adjustment relative thereto, means extending through said base and adjustable against said extension to secure the turret in adjusted positions, said turret including a rectangular plate-like part at the upper side of said extension, a carriage including a plate-like part slidable on the plate-like part of the turret and guided thereby, said carriage including end portions overhanging the end portions of the turret and limiting movement of the carriage on the turret, means to move the carriage on the plate-like part of the turret, and said carriage having a recess substantially identical with the first mentioned recess and opening through the upper face thereof for the reception of a similar extension.

30. In a head of the class described, a base having a circular recess opening through a face thereof, a turret, a circular extension rigid with said turret and rotatably disposed in said recess and thereby mounting the turret for adjustment on said base, means extending through said base radially with respect to said extension and adjustable against the latter to secure the turret in adjusted positions, said turret including a rectangular plate-like upper part, a carriage including a plate-like part slidable on the plate-like part of the turret and guided by the edges thereof, said carriage having a recess substantially identical with the first mentioned recess and opening through the upper face of the carriage, a bracket, a circular extension rigid with said bracket and substantially identical with the first mentioned extension and located in the second mentioned recess and mounting the bracket on the carriage for rotatable adjustment relative thereto, means extending through said carriage radially with respect to said extension of the bracket and adjustable against said extension to secure said bracket in adjusted positions, and a tool receiving chuck mounted by the bracket.

31. In a machine, a base, a support movable on said base, V-shaped guideways and V-shaped blocks betwen said base and support and providing for movement of the latter on the former, means for moving said support relative to said base on said guides and guideways, said V-shaped guideways arranged with their open sides facing vertically and receiving the inclined portions of said blocks, a bar rigid with one of said base and support, a clamping block rigid with the other of said base and support and having an opening through which said bar passes, said clamping block split from said opening through a side, means for forcing toward one another the split portions of said clamping block to have it grip the bar whereby to secure the support and base together, and said clamping block arranged so that as its split portions are forced toward one another it acts on said bar to bring about relative vertical movement between the base and support to force said V-shaped guideways and V-shaped blocks into tighter engagement to secure the support in adjusted position on the base without imparting movement to said support in a direction laterally or longitudinally of said guideways.

32. A grinding machine including a table having a way in its upper side and a circular recess in its lower side, a disc in said recess, a key associated with said disc, means pivotally mounting the table on the disc and adapted to be tightened to secure the disc and table rigidly together, means associated with said disc and key for mounting said table on a second table, a tool supporting head, means associated with said head and adapted to cooperate with the slot in the first table to mount the head thereon, said head including a base, a turret turnable on said base, means to secure the turret in fixed position on said base, a carriage slidable on said turret, manual means for sliding said carriage on the turret, a bracket mounted on the carriage for turning movement relative thereto, means to secure the bracket in fixed position relative to said carriage, a tool holding spindle, and means mounting said spindle in said bracket.

WALTER G. WESSMAN.